US007256527B2

(12) United States Patent
Niimi

(10) Patent No.: US 7,256,527 B2
(45) Date of Patent: Aug. 14, 2007

(54) BRUSH HOLDING DEVICE

(75) Inventor: Masami Niimi, Handa (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 11/482,030

(22) Filed: Jul. 7, 2006

(65) Prior Publication Data

US 2007/0007846 A1 Jan. 11, 2007

(30) Foreign Application Priority Data

Jul. 8, 2005 (JP) ............................ 2005-200589

(51) Int. Cl.
*H02K 13/00* (2006.01)
*H02K 5/14* (2006.01)

(52) U.S. Cl. ...................................... 310/239; 310/242

(58) Field of Classification Search ................ 310/239, 310/242, 245, 247
See application file for complete search history.

(56) References Cited

U.S. PATENT DOCUMENTS

| | | | | | |
|---|---|---|---|---|---|
| 3,159,763 | A * | 12/1964 | Colvill et al. | ............... | 310/238 |
| 3,493,802 | A * | 2/1970 | Ruehle et al. | .............. | 310/239 |
| 4,559,465 | A | 12/1985 | Gagneux | | |
| 5,717,271 | A * | 2/1998 | Aoki et al. | ................. | 310/242 |
| 5,973,433 | A * | 10/1999 | Kiehnle et al. | ............. | 310/239 |
| 6,005,323 | A | 12/1999 | Morimoto et al. | | |
| 6,271,615 | B1 * | 8/2001 | Morimoto et al. | .......... | 310/239 |
| 2007/0007846 | A1 * | 1/2007 | Niimi | ......................... | 310/239 |

FOREIGN PATENT DOCUMENTS

| | | |
|---|---|---|
| JP | A 59-501336 | 7/1984 |
| JP | U 06-060276 | 8/1994 |
| JP | B2 3486094 | 1/2004 |

* cited by examiner

*Primary Examiner*—Karl Tamai
*Assistant Examiner*—David W. Scheuermann
(74) *Attorney, Agent, or Firm*—Oliff & Berridge, PLC

(57) ABSTRACT

The brush holding device includes a brush holder having a brush-housing chamber, and a holder plate to which the brush holder is attached. The holder plate is formed with a center hole at a center portion thereof, the center hole having a size allowing a commutator to path therethrough, and a pair of elongated holes opposing to each other with respect to the opening portion, the elongated holes defining bridge portions with the opening hole. The brush holder has a thick-wall portion integral with a bottom wall of the brush-housing chamber, the thick-wall portion being formed with fitting grooves at lateral sides thereof. The bridge portions are inserted into the fitting grooves so that the brush holder is fitted to the holding plate in such a state that the thick-wall portion is caught between the bridge portions.

4 Claims, 4 Drawing Sheets

BRUSH HOLDING DEVICE

CROSS-REFERENCE TO RELATED APPLICATION

This application is related to Japanese Patent Application No. 2005-200589 filed on Jul. 8, 2005, the contents of which are hereby incorporated by reference.

BACKGROUND OF THE INVENTION

1. Field of the Invention

The present invention relates to a brush holding device of a DC motor.

2. Description of Related Art

A DC motor having a brush is provided with a brush holding device as described in, for example, in Japanese Patent No. 3486094. As shown in FIG. 7, this brush holding device is constituted by a brush holder 100 made of resin for housing a brush (not shown), and a holder plate 110 to which the brush holder 100 is fixed. The holder plate 110 has a pair of engaging pieces 111 which are partially cut out from the surface thereof, and are bent so as to oppose to each other. The brush holder 100 is provided with, at a bottom part thereof, plate-like convex parts 101 projecting laterally. These plate-like convex parts 101 become caught in the gaps between the engaging pieces 111 and the surface of the holder plate 110.

The above described brush holding device has a problem in that it is difficult for the engaging pieces 111 have a sufficient height, because they are formed by partially cutting out the surface of the holder plate 110. Accordingly, since the gap height between the surface of the holder plate 110 and the engaging piece 111 cannot be made large enough, the plate-like convex parts 101 cannot have a sufficient thickness. This makes it difficult for the brush holding device 100 to have a sufficiently high strength.

In addition, since the brush holder 100 is fitted to the holder plate 110 by inserting the plate-like convex parts 101 into the gaps between the engaging pieces 111 and the surface of the holder plate 110, the brush holder 100 cannot be fixed solidly if the bending strength of the engaging pieces 111 is not high enough. The bending strength of the engaging piece 111 can be increased by increasing its thickness. However, since the thickness of the engaging piece 111 is equal to the thickness of the holder plate 110, it is not possible to make the thickness of the engaging piece 111 larger than that of the holder plate 110. Since increasing the thickness of the holder plate 110 leads to increasing the weight and axial length of a DC motor, it is difficult to increase the thickness of the holder plate 110, especially in a case of a starter motor which is strongly required to be of small size, and light weight.

SUMMARY OF THE INVENTION

The present invention provides a brush holding device for a DC motor comprising:

a brush holder having a brush-housing chamber therein for housing a brush member; and a holder plate to which the brush holder is attached;

wherein the holder plate is formed with a center hole at a center portion thereof, the center hole having a size allowing a commutator to path therethrough, an opening portion opening to the center hole, the opening portion having a constant width in a direction from the center portion to an peripheral portion of the holder plate, and a pair of elongated holes opposing to each other with respect to the opening portion, the elongated holes defining bridge portions with the opening hole, and wherein the brush holder has a thick-wall portion integral with a bottom wall of the brush-housing chamber, the thick-wall portion being formed with fitting grooves at lateral sides thereof, the bridge portions being inserted into the fitting grooves so that the brush holder is fitted to the holding plate in such a state that the thick-wall portion is caught between the bridge portions.

According to the present invention, in which the bridge portions on the both lateral sides of the opening portion are inserted into the fitting grooves formed in the both lateral sides of the thick-wall portion, so that the thick-wall portion is caught in the width direction thereof between the bridge portions, it is possible for the brush holder to receive a fixing force at the thick-wall portion thereof. Accordingly, with the present invention, it is possible to provide the brush holder with a sufficiently large strength to withstand a large fixing force.

Furthermore, since the bridge portions situated between the opening portion and the elongated holes can yield moderately towards the elongated hole when the bridge portions are inserted into the fitting grooves formed in the thick-wall portion, it becomes possible to prevent the load necessary to insert the bridge portions into the fitting grooves from becoming excessive to thereby facilitate the fitting work of the brush holder to the holder plate, and prevent breakage of the brush holder during the fitting work.

Other advantages and features will become apparent from the following description including the drawings and claims.

PREFERRED EMBODIMENTS OF THE INVENTION

First Embodiment

Figure 1:
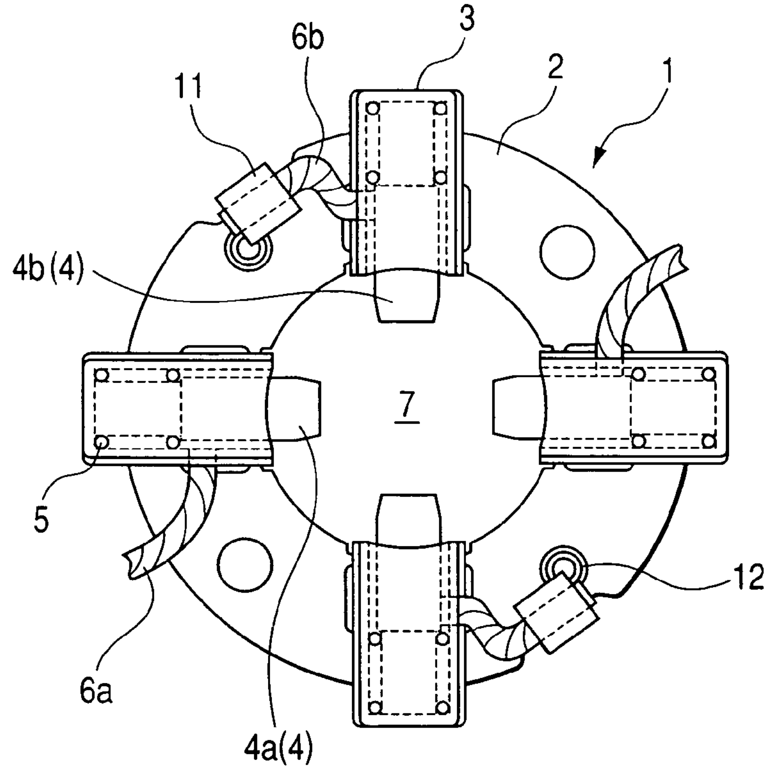
FIG. 1 is a plan view of a brush holding device according to a first embodiment of the invention.

Fig. is a plan view of a brush holding device 1 according to a first embodiment of the invention. The brush holding device 1, which can be used for an engine starter of a vehicle, for example, includes a holder plate 2 made of a thin metal plate such as a steel plate, and resin-made brush holders 3 fitted to the holder plate 2. Brushes 4 held in the brush holders 3 are disposed around a commutator (not shown) of an armature (not shown).

The brush 4 includes two positive brush members **4*a* and two negative brush members 4*b* disposed respectively at the positive electrode side and at the negative electrode side of the armature. These brush members are biased towards the commutator by a brush spring 5. Each of the positive brush members 4***a* is connected to a field coil (not shown) through a lead wire 6*a*. Each of the negative brush members 4*b* is connected to the holder plate 2 through a lead wire 6*b*.

Figure 2:
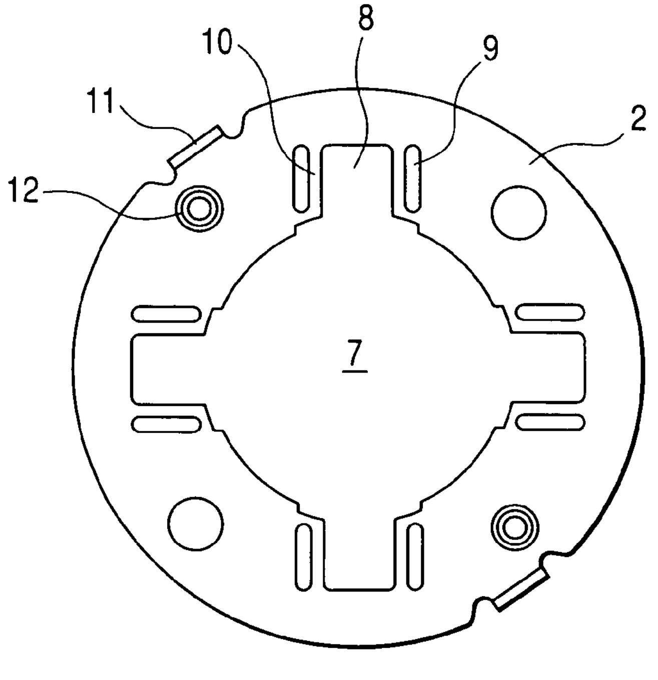
FIG. 2 is a plan view of a holder plate of the brush holding device.

As shown in FIG. 2, the holder plate 2 has a circular outer shape, and is formed with a center hole 7 at a center portion thereof, four opening portions 8 evenly spaced around the periphery of the center hole 7, and four pairs of elongated holes 9 each of which is disposed at both lateral sides (radial sides) of the opening portion 8 so as to oppose to each other with respect to the opening portion 8. The center hole 7 has a size allowing the commutator to path therethrough. The opening portion 8 has an opening width which is constant in the direction of the radius of the center hole 7. The opening width of the opening portion 8 is slightly smaller than the full width of the brush holder 3.

Figure 3:
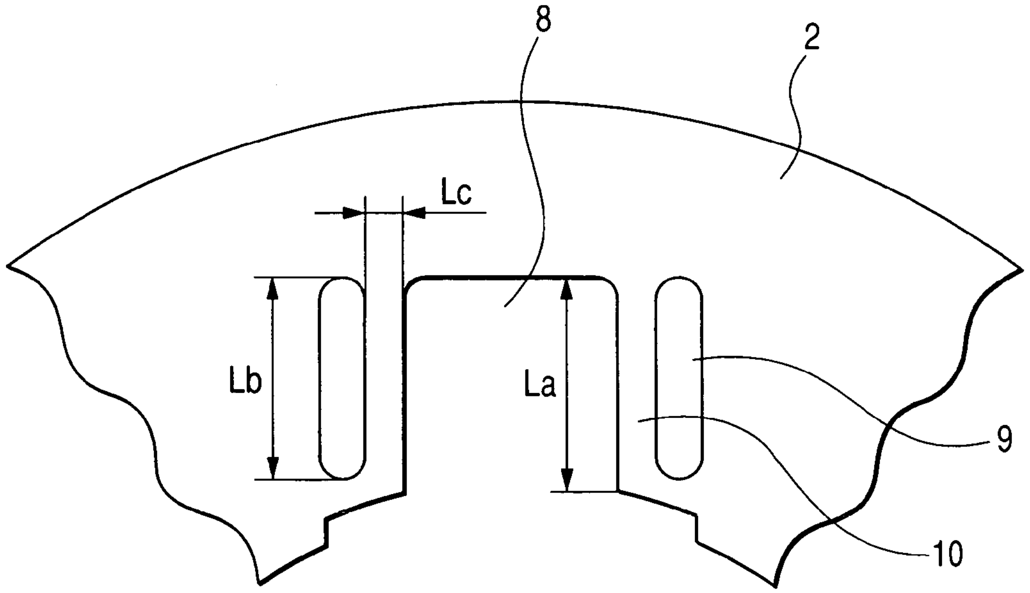
FIG. 3 is a partially enlarged view of the holder plate.

As shown in FIG. 3, the longitudinal direction of the elongated hole 9 is parallel to the both lateral sides of the opening portion 8, and the longitudinal length Lb of the elongated hole 9 is about the same as the radial length La of the opening portion 8. A bridge portion 10 of the holder plate 2 situated between the opening portion 8 and the elongated hole 9 has a width Lc which is twice as large as the thickness Ld of the holder plate 2 or smaller (see FIG. 5). The holder plate 2 is provided with two arm portions 11 opposed to each other in the radial direction. These arm portions 11 are connected to the lead wires 6*b* of the negative brush members 4*b* (see FIG. 1). The holder plate 2 has two screw holes 12 formed at positions inward of the arm portions 11 for the purpose of securing the holder plate 2 to an end frame (not shown) of the starter motor by screws.

Figure 4A:
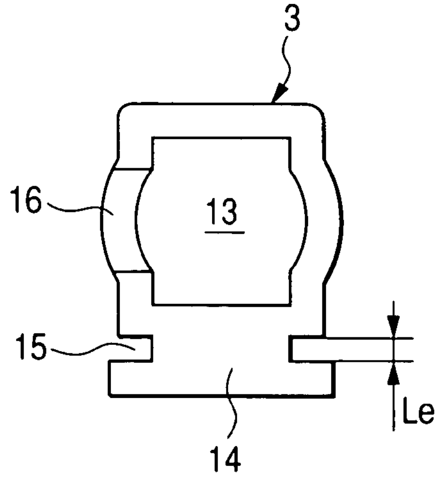
FIG. 4A is a front view of a brush holder of the brush holding device.
Figure 4B:
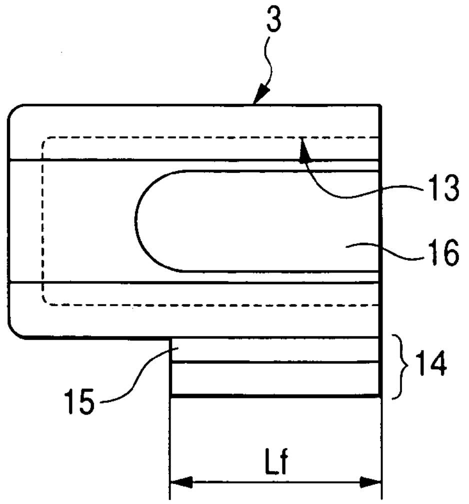
FIG. 4B is a side view of the brush holder.

As shown in FIGS. 4A and 4B, the brush holder 3 in the shape of a box has therein a brush-housing chamber 13 to house the brush member 4*a* or 4*b*, and the brush spring 5. As shown in FIG. 4B, one end of the brush-housing chamber 13 is open to let in and out the brush member 4*a* or 4*b* (see FIG. 4B). The brush holder 3 has a thick-wall portion 14 integral with a bottom wall of the brush-housing chamber 13. The thick-wall portion 14 is formed with fitting grooves 15 at both lateral sides thereof with respect to its width direction. The fitting groove 15 has a width Le about the same as the thickness Ld of the holder plate 2 (see FIG. 5), and a length Lf about the same as the longitudinal length La of the opening portion 8 (see FIG. 3). The brush holder 3 is formed with a lead hole 16 for drawing out the lead wire 6 from the brush-housing chamber 13 at one of the lateral sides thereof. This lead hole 16 is open at one end thereof like the brush-housing chamber 13.

Figure 5:
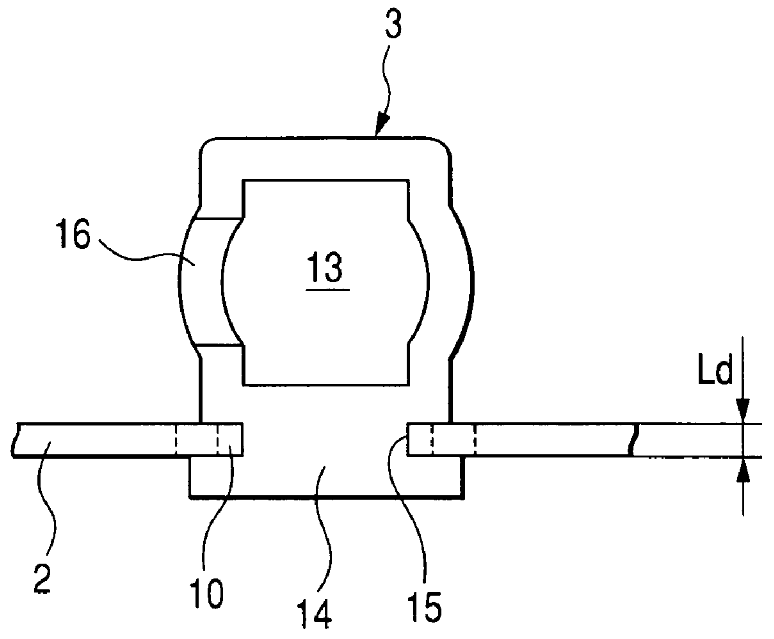
FIG. 5 is a front view of the brush holder fitted to the holder plate.

Next, explanation is made as to how the brush holder 3 is fitted to the holder plate 2. The thick-wall portion 14 of the brush holder 3 is inserted into the opening portion 8 by sliding the brush holder 3 to the opening portion 8 from the radially inner side of the center hole 7 with the bottom end side of the brush-housing chamber 13 facing the opening portion 8, and the bridge portions 10 on the both lateral sides of the opening portion 8 being caught in the fitting grooves 15. By doing this, as shown in FIG. 5, the brush holder 3 is fixed to the holder plate 2 in such a state that the thick-wall portion 14 is caught in the width direction (in the horizontal direction in FIG. 5) by the bridge portions 10 on the both lateral sides of the opening portion 8 of the holder plate 2.

The first embodiment described above offers the following advantages.

The bridge portions 10 on the both lateral sides of the opening portion 8 are inserted into the fitting grooves 15 formed in the both lateral sides of the thick-wall portion 14, so that the thick-wall portion 14 is caught in the width direction thereof between the bridge portions 10. This enables the brush holder 3 to receive a fixing force at the thick-wall portion 14 thereof. Accordingly, with this embodiment, it is possible to provide the brush holder 3 with a sufficiently large strength to withstand a large fixing force.

The bridge portion 10 situated between the opening portion 8 and the elongated hole 9 can yield moderately towards the elongated hole 9 when the bridge portion 10 is inserted into the fitting groove 15 formed in the thick-wall portion 14. This makes it possible to prevent the load necessary to insert the bridge portions 10 into the fitting grooves 15 from becoming excessive to thereby facilitate the fitting work of the brush holder 3 to the holder plate 2, and prevent breakage of the brush holder 3 during the fitting work.

Incidentally, it should be noted that the degree of yielding of the bridge portion 10 reduces, and the load necessary to insert the bridge portion 10 into the fitting groove 15 increases with the increase of the width of the bridge portion 10. Accordingly, it is preferable that the width of the bridge portion 10 does not exceed twice the thickness of the holder plate 2, so that the bridge portion 10 can yield moderately towards the elongated hole 9 to facilitate the fitting work of the brush holder 3.

Second Embodiment

Figure 6:
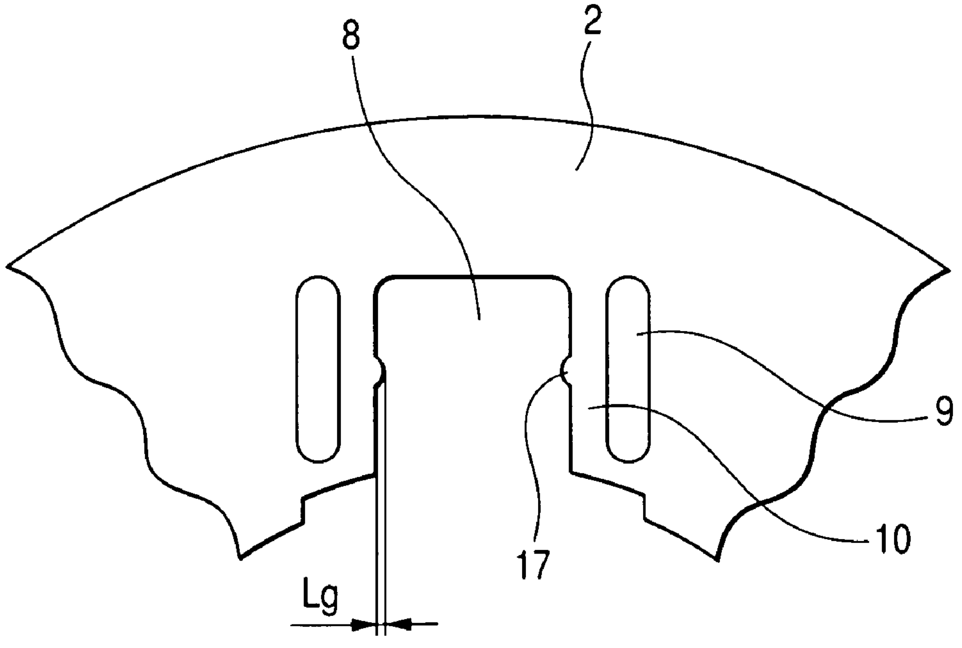
FIG. 6 is a partial plan view of a holder plate of a brush holding device according to a second embodiment of the invention.
Figure 7:
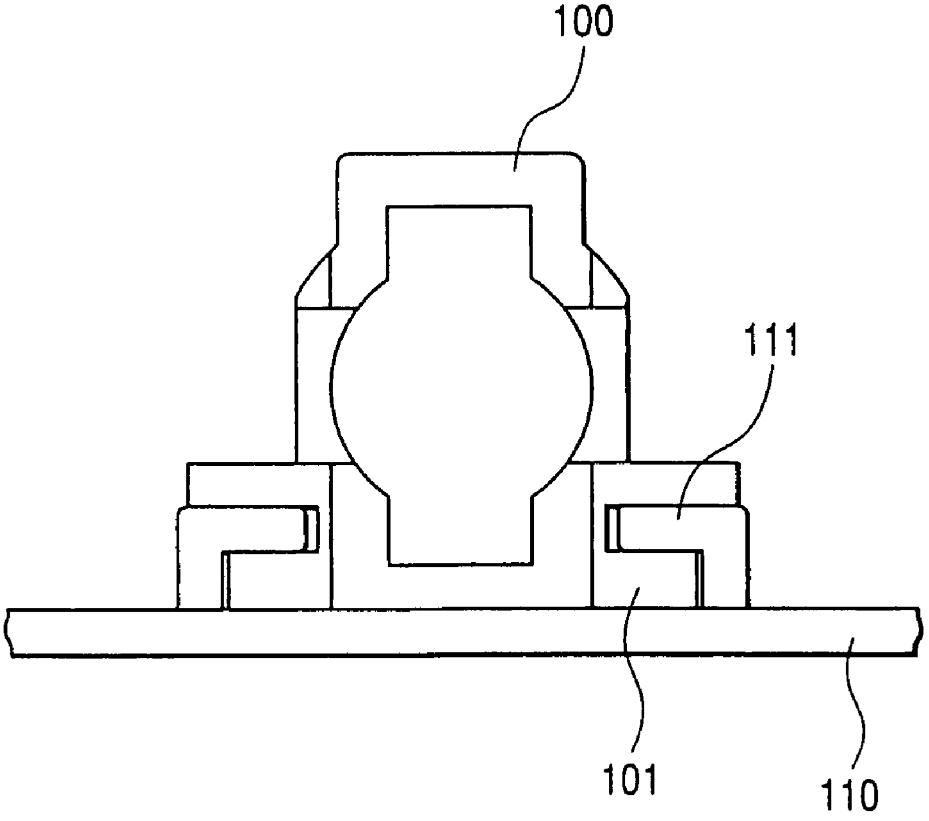
FIG. 7 Prior Art
FIG. 7 is a front view of a conventional brush holding device.

FIG. 6 is a partially enlarged view of the holder plate 2 of a brush holding device according to a second embodiment of the invention, which shows the opening portion 8 and its vicinity.

As shown in this figure, in the second embodiment, projecting portions 17 are formed in the both lateral sides of the opening portion 8 of the holder plate 2 such that they project towards each other. The projecting portion 17 is situated midway of the lateral side of the opening portion 8, and has a projection height g smaller than the thickness Ld of the holder plate 2 (see FIG. 5). In this embodiment, the degree of yielding of the bridge portion 10 at the middle portion thereof when the bridge portion 10 is inserted into the fitting groove 15 is larger than those at the end portions thereof because of the provision of the projecting portion 17. Accordingly, in this embodiment, the brush holder 3 can be held firmly by the projecting portion 17 and the end portions of the opening portion 8.

However, if the projection height Lg of the projecting portion 17 is increased more than necessary, not only the load necessary to insert the thick-wall portion 14 to the opening portion 8 increases, but also there arises a possibility that the brush holder 3 is inclined, because, in this case, it is difficult to uniformly hold the brush holder 3 by the end portions and the projecting portions 17 of the lateral sides of the opening portion 8. Accordingly, it is preferable that the projection height Lg of the projecting portion 17 is smaller than the thickness Ld of the holder plate 2, so that the brush holder 3 can be uniformly held by the end portions and the projecting portions 17 of the lateral sides of the opening portion 8, and the inserting load can be prevented from becoming excessive.

The above explained preferred embodiments are exemplary of the invention of the present application which is described solely by the claims appended below. It should be understood that modifications of the preferred embodiments may be made as would occur to one of skill in the art.

What is claimed is:

1. A brush holding device for a DC motor comprising:

a brush holder made of a resin having a brush-housing chamber therein for housing a brush member; and a holder plate made of a thin metal plate to which said brush holder is attached;

wherein said holder plate is formed with a center hole at a center portion thereof, said center hole having a size allowing a commutator to path therethrough, an opening portion opening to said center hole, and a pair of elongated holes opposing to each other with respect to said opening portion, said elongated holes defining bridge portions with said opening hole, and wherein said brush holder has a thick-wall portion integral with a bottom wall of said brush-housing chamber, said thick-wall portion being formed with fitting grooves at lateral sides thereof, said bridge portions being inserted into said fitting grooves so that said brush holder is fitted to said holding plate in such a state that said thick-wall portion is caught between said bridge portions.

2. The brush holding device according to claim 1, wherein said elongated holes are substantially parallel to lateral sides of said opening hole, and have substantially the same length as said opening portion in a radial direction of said holder plate.

3. The brush holding device according to claim 1, wherein each of said bridge portions has a projecting portion, said projecting portions of said bridge portions projecting towards each other, and a projection height of said projecting portions is smaller than a thickness of said holder plate.

4. The brush holding device according to claim 1, wherein a width of said bridge portions is not larger than twice a thickness of said holder plate.

* * * * *